though directed to ceramics, is equally applicable to the preparation of alumina slips used in papermaking, coatings for metals, etc.

3,261,702
METHOD OF PREPARING ALUMINA CASTING SLIPS
Leroy D. Hart, Crestwood, Mo., and William F. Graebe, Belleville, Ill., assignors to Aluminum Company of America, Pittsburgh, Pa., a corporation of Pennsylvania
No Drawing. Filed Dec. 3, 1962, Ser. No. 241,532
3 Claims. (Cl. 106—65)

This invention relates to a method of preparing soda-containing alumina for use in slips and also relates to a method of making slips containing such alumina.

Alumina slips may be used for such well-known applications as coatings for paper, metals and ceramic materials, and in the production of such ceramic articles as electrical insulators, china, sanitary ware, floor and wall tile, and refractories. In making alumina slips, it is customary to employ alumina which has been produced by heating alumina hydrate to drive off most of the water. This alumina frequently contains small amounts of a sodium compound or compounds—usually calculated and referred to as soda ($Na_2O$). As much as one-half of the total soda in the alumina may be present as water-soluble soda which for many applications is objectionable because of its deleterious effects on the rheological properties of the slip.

A well-known process for making high-strength alumina porcelain insulators will be used to illustrate and explain in detail the objectionable features of soluble soda in alumina employed in the preparation of slips. Alumina porcelain insulators are generally made by blending a mixture of alumina, clay and feldspar in an aqueous suspension by means of an agitator-equipped tank known as a blunger. After these components have been thoroughly mixed in the blunging operation and subsequently screened to remove coarse contaminants, the water slurry or slip is treated to maintain the suspension in a state of flocculation after which it is filtered to produce a filter cake. These filter cakes are then molded into some desired blank shape by well-known methods, as for example by extrusion in a vacuum pug mill. The blank shapes are subsequently converted into finished shapes by machining, as by turning in a lathe. The partially dried, finished shapes are then completely dried, glazed and fired to produce a finished product.

In making articles according to the above-described procedure, there has been a certain amount of cracking of the molded shapes either during or before drying in the unfired state and sometimes after firing. This cracking is believed to be caused by water-soluble soda ($Na_2O$) being slowly released from the alumina in aqueous suspension. The soluble soda released is throught to cause the aqueous suspension to become increasingly more alkaline which in turn causes the clay-alumina particles to be more widely dispersed throughout the suspension rather than remaining in the flocculated state. This condition causes the slip to filter with difficulty and the resulting filter cake to have very poor plasticity and sometimes thixotropic tendencies. Filter cakes having poor plasticity and thixotropic properties when subjected to the extrusion and molding operations, develop strains which ultimately result in cracks, tears and checks in the shaped articles when they are dried and fired.

It can be seen from the foregoing illustration that the use of alumina containing water-soluble soda for the preparation of slips results in suspensions having unstable rheological properties which adversely affects subsequent operations involving use of the slip. It is an object of this invention to provide a method of preparing alumina containing water-soluble soda for use in slips to prevent instability in the rheological properties of the slip and thereby eliminate undersirable effects resulting from use of such a suspension in succeeding operations.

In making slips, for example, in the production of ceramic articles, alumina, which consists almost entirely of alpha alumina, is employed. This alumina usually has a total soda content of from 0.3% to 0.6%, by weight, the water-soluble portion of which is detrimental in the production of ceramic articles. When the alumina is mixed with clay and feldspar in an aqueous suspension, acid salts are usually added in an amount sufficient to adjust the water slurry or slip to a pH of 6.8 to 7.2. When the pH is maintained within this range the slip is in a state of flocculation. Under these conditions the filtration rate of the slip and plasticity of the filter cake are at their maximum and the tendency for an article made therefrom to crack upon drying is at a minimum. However, as previously described, a slip having alumina which contains water-soluble soda will become increasingly more alkaline, even after neutralization, due to slow release of this soda. This, of course, causes the pH to drift above the desired pH range of 6.8 to 7.2. It is, therefore, desirable to be able to insolubilize the soda in such a way that the pH of the slip may be maintained within the desired range.

In accordance with this invention it has been found that with the addition of a siliceous material to alumina containing water-soluble soda and thereafter heating the mixture to insolubilize the soda, the pH of slips made therefrom may be readily maintained within the desired pH range of 6.8 to 7.2. The term "siliceous material" as used herein means a material that will provide silica values which, when combined with soda and heated, will produce a sodium compound that is insoluble in water. The mixture should contain less than 0.3%, by weight, of added basic oxides, as distinguished from the amount of any basic oxides present in the alumina, and compounds containing magnesia and silica. Basic oxides, such as oxides of the alkali metals and alkaline earth metals (including magnesium), and compounds containing magnesia and silica, for example, magnesium silicate, when added in excess of the above amount cause the reaction to be detrimentally affected. The stabilization of the pH is due to the insolubilization of the soda, probably by the formation of insoluble sodium aluminum silicate. The mixture of alumina and siliceous material should be heated at a temperature of 900° to 1600° C. for a sufficient length of time to insolubilize the soda. Generally the period of heating within the foregoing temperature range should extend over a period of about 2 or 3 minutes to 5 hours, the length of time being dependent upon the temperature, mass of the mixture being heated, amount of soda present in the alumina, and the amount of siliceous material added. A temperature range of 1200 to 1600° C. is typically employed, for in this temperature range the maximum degree of soda insolubilization is achieved within practical retention times of less than one hour. Heating to a temperature in the lower portion of the temperature range usually requires a longer time to insolubilize the soda than heating within the upper portion of the temperature range.

The siliceous material may be added to the alumina in various forms, such as, for example, silicic acid, bentonite clay, flint, or colloidal silica. The siliceous material should be of a particle size fine enough, preferably to substantially pass a 325 mesh screen, to insure good dispersion of the additive in the alumina. The amount of siliceous material added for maximum conversion of water-soluble soda to insoluble soda should be equivalent to 1 to 12%, by weight, of $SiO_2$, on the basis of $Al_2O_3$. After conversion of the soda to the insoluble form by adding the proper amount of siliceous material and heating in accordance with the above-described invention, the water-soluble soda content is usually no more than 0.01%, by weight.

The improvement in preparing alumina containing soda for use in slips by adding a siliceous material and thereafter heating to insolubilize the soda is illustrated in the following example.

*Example*

Alumina produced by heating alumina hydrate to drive off most of the water was divided into five lots. Lot No. 1 was not subsequently heated and no siliceous material was added thereto. The water-soluble soda content of Lot No. 1 was 0.11%, by weight ($Al_2O_3$ basis). Lot No. 2 was subsequently heated at a temperature of 1200° C. for a period of one hour, but without any siliceous material being added. The water-soluble soda content of Lot No. 2, after heating, was 0.093%, by weight ($Al_2O_3$ basis). Lot Nos. 3, 4 and 5 were mixed respectively with 4.25%, 8.5% and 17%, by weight, bentonite clay, which was equivalent to 3%, 6% and 12% $SiO_2$ respectively on the basis of $Al_2O_3$, and these mixtures were heated at 1200° C. for a period of one hour. Separate slips were made in accordance with a commonly used formulation consisting of 60% clay and 40% alumina in an aqueous suspension containing 50% solids. The slips made from Lot Nos. 1 and 2 were neutralized to a pH of 7 by adding a sufficient amount of 0.4 N hydrochloric acid. The pH of Lot No. 3 was adjusted from 7.1 to 6.8. Lot Nos. 4 and 5 did not have the pH adjusted. The results of these tests are summarized in the following table:

TABLE I

| Lot No. | Siliceous material added percent ($Al_2O_3$ basis) | | Water-soluble soda content as $Na_2O$ percent ($Al_2O_3$ basis) | Initial pH | Neutralization with 0.4 N HCl cc. | pH after aging for 24 hours |
|---|---|---|---|---|---|---|
| | Bentonite clay | $SiO_2$ equivalent | | | | |
| 1 | 0 | 0 | 0.11 | 8.2 | .2 | 7.5 |
| 2 | 0 | 0 | 0.093 | 8.5 | 0.5 | 8.4 |
| 3 | 4.25 | 3 | 0.008 | 7.1 | 0.05 | 6.9 |
| 4 | 8.5 | 6 | 0.004 | 6.8 | 0 | 7.2 |
| 5 | 17 | 12 | 0.003 | 6.7 | 0 | 7.1 |

An analysis of this example shows that alumina containing water-soluble soda, having a siliceous material added thereto and the mixture subsequently heated produces a slip which: (1) has a lower water-soluble soda content, (2) has a lower initial pH, (3) requires significantly less or no acid addition for neutralization, and (4) has significantly less or no drift in pH after 24 hours of aging, when compared to slips not made in accordance with the herein described invention.

What is claimed is:

1. A method of preparing slips which comprises heating a mixture of siliceous material and alumina containing water-soluble soda, said mixture having less than 0.3%, by weight of added basic oxides and compounds containing both magnesia and silica, at a temperature of 900 to 1600° centigrade for sufficient time to insolubilize the soda, and thereafter preparing a slip from the resultant material containing insolubilized soda and siliceous material.

2. A method of preparing slips according to claim 1 wherein the siliceous material is added to the alumina in the amount equivalent to 1 to 12% $SiO_2$, by weight, based on $Al_2O_3$.

3. A method of preparing slips which comprises heating a mixture of alumina containing water-soluble soda and siliceous material in an amount equivalent to 1 to 12% $SiO_2$, by weight, based on $Al_2O_3$, said mixture having less than 0.3%, by weight, of added basic oxides and compounds containing both magnesia and silica, at a temperature of 900 to 1600° centigrade for 2 minutes to 5 hours, and thereafter preparing a slip from the resultant material containing insolubilized soda and siliceous material.

References Cited by the Examiner

UNITED STATES PATENTS 2,942,991  6/1960  Smith _____ 106—65
3,106,452  10/1963  Watson et al. _____ 106—65

TOBIAS E. LEVOW, *Primary Examiner.*

J. E. POER, *Assistant Examiner.*